(12) United States Patent
Benzing, II et al.

(10) Patent No.: US 9,834,040 B2
(45) Date of Patent: *Dec. 5, 2017

(54) STRUCTURALLY SUPPORTED TIRE

(71) Applicant: The Goodyear Tire & Rubber Company, Akron, OH (US)

(72) Inventors: James Alfred Benzing, II, North Canton, OH (US); Daniel Ray Downing, Uniontown, OH (US); Joseph Carmine Lettieri, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/965,248

(22) Filed: Dec. 10, 2015

(65) Prior Publication Data

US 2017/0166009 A1   Jun. 15, 2017

(51) Int. Cl.
   *B60C 7/00* (2006.01)
   *B60C 7/06* (2006.01)
   *B60C 7/24* (2006.01)

(52) U.S. Cl.
   CPC .................. *B60C 7/00* (2013.01); *B60C 7/06* (2013.01); *B60C 7/24* (2013.01)

(58) Field of Classification Search
   CPC ................ B60C 7/00; B60C 7/06; B60C 7/24
   USPC ........ 152/69, 71, 75, 76, 80, 81, 82, 83, 84, 152/85, 86, 379.3, 383, 381.3, 381.4, 152/381.5, 381.6, 378, 375, 386–389, 152/396, 397, 268
   See application file for complete search history.

(56) References Cited

U.S. PATENT DOCUMENTS

| 479,255 A | 7/1892 | Dunlop |
| 482,175 A | 9/1892 | Hollafolla |
| 1,016,991 A * | 2/1912 | Herold ...................... B60C 7/14 152/268 |
| 1,389,285 A | 8/1921 | Althoff |
| 1,651,211 A | 11/1927 | Lambert |
| 1,930,764 A | 10/1933 | Mallory |

(Continued)

FOREIGN PATENT DOCUMENTS

| EP | 1022162 A1 * | 7/2000 | ............... B60C 3/00 |
| FR | 2856635 A1 | 12/2004 | |
| GB | 191020865 A | 0/1911 | |

OTHER PUBLICATIONS

European Search Report dated May 11, 2017 for Application Serial No. EP16201197.

*Primary Examiner* — S. Joseph Morano
*Assistant Examiner* — Jean Charleston
(74) *Attorney, Agent, or Firm* — Robert N. Lipcsik

(57) ABSTRACT

A structurally supported tire includes a ground contacting annular tread portion, an annular hoop structure for supporting a load on the tire, a means for attachment to a vehicle rim, and a ply structure secured to a first axial limit and extending radially outward and between the hoop structure and the tread portion and further extending radially inward from between the hoop structure and tread portion to a second axial limit. The ply structure is secured to both the first axial limit and the second axial limit. The tread portion is secured to a radially outer surface of the ply structure. The hoop structure is secured to a radially inner surface of the ply structure.

11 Claims, 4 Drawing Sheets

(56) References Cited

U.S. PATENT DOCUMENTS

| | | | |
|---|---|---|---|
| 1,966,397 A | | 7/1934 | Sohl |
| 2,313,763 A | * | 3/1943 | Olsen ..................... E01B 11/38 |
| | | | 411/223 |
| 2,906,314 A | | 9/1959 | Trevaskis |
| 3,018,809 A | | 1/1962 | Bernard |
| 3,112,234 A | | 11/1963 | Krupp |
| 3,575,227 A | | 4/1971 | Bartley |
| 3,712,362 A | | 1/1973 | Alderfer |
| 4,057,445 A | * | 11/1977 | Brinkley ................ B29D 30/08 |
| | | | 152/512 |
| 4,085,786 A | * | 4/1978 | Caravito ................ B29D 30/08 |
| | | | 152/158 |
| 4,142,567 A | * | 3/1979 | Johannsen ................ B60C 3/00 |
| | | | 152/458 |
| 4,170,254 A | | 10/1979 | Jackson |
| 4,226,273 A | | 10/1980 | Long et al. |
| 4,235,270 A | | 11/1980 | Kahaner et al. |
| 4,248,287 A | | 2/1981 | Christman |
| 4,589,460 A | | 5/1986 | Albee |
| 5,078,192 A | | 1/1992 | Lindsey |
| 6,068,721 A | | 5/2000 | Dyer et al. |
| 6,260,598 B1 | | 7/2001 | Tanaka |
| 6,769,465 B2 | | 8/2004 | Rhyne et al. |
| 6,994,135 B2 | | 2/2006 | Delfino et al. |
| 7,281,553 B1 | * | 10/2007 | Roesgen ............. B60C 17/0009 |
| | | | 152/197 |
| 8,845,836 B2 | | 9/2014 | Losey et al. |
| 8,973,635 B2 | | 3/2015 | Losey et al. |

\* cited by examiner

STRUCTURALLY SUPPORTED TIRE

FIELD OF THE INVENTION

The present invention relates generally to vehicle tires and wheels, and more particularly, to non-pneumatic tire/wheel assemblies.

BACKGROUND OF THE INVENTION

The pneumatic tire has been the solution of choice for vehicular mobility for over a century. Modern belted, radial carcass, pneumatic tires are remarkable products that provide an effective means for supporting applied loads while allowing reasonable vertical and lateral compliance. The pneumatic tire obtains its mechanical attributes largely due to the action of internal air pressure in the tire cavity. Reaction to the inflation pressure corrects rigidities to the belt and carcass components. Inflation pressure is then one of the most important design parameters for a pneumatic tire.

Good pressure maintenance is required to obtain the best performance from a pneumatic tire. Inflation pressure below that specified can result in a loss of fuel economy. Of primary importance is that a conventional pneumatic tire is capable of very limited use after a complete loss of inflation pressure. Many tire constructions have been proposed for continued mobility of a vehicle after a complete loss of air pressure from the tire. Commercially available runflat tire solutions are pneumatic tires having added sidewall reinforcements or fillers to permit the sidewalls to act in compression as load supporting members during deflated operation. This added reinforcement often results in the disadvantages of higher tire mass and reduced riding comfort. Other attempts to provide runflat capability utilize essentially annular reinforcing bands in the tire crown portion. In these solutions, the rigidity of the tread portion results partly from the inherent properties of the annular reinforcing band and partly from the reaction to inflation pressure. Still other solutions rely on secondary internal support structures attached to the wheel. These supports add mass to the mounted assembly and either increase mounting difficulty or may require the use of multiple piece rims. All of these approaches are hybrids of an otherwise pneumatic tire structure and suffer from design compromises that are optimal for neither the inflated nor deflated states. In addition, these runflat solutions require the use of some means to monitor tire inflation pressure and to inform the vehicle operator if the inflation pressure is outside the recommended limits.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

SUMMARY OF THE INVENTION

A structurally supported tire in accordance with the present invention includes a ground contacting annular tread portion, an annular hoop structure for supporting a load on the tire, a means for attachment to a vehicle rim, and a ply structure secured to a first axial limit and extending radially outward and between the hoop structure and the tread portion and further extending radially inward from between the hoop structure and tread portion to a second axial limit. The ply structure is secured to both the first axial limit and the second axial limit. The tread portion is secured to a radially outer surface of the ply structure. The hoop structure is secured to a radially inner surface of the ply structure.

According to another aspect of the tire, inner radii of the ply structure are attached to the vehicle rim through two mechanical clamps each capturing a part of the ply structure.

According to still another aspect of the tire, inner radii of the ply structure are attached to the vehicle rim through mechanical clamps and a clamping force is strengthened by adding rings around which the ply structure is folded.

According to yet another aspect of the tire, an axial distance between the first axial limit and the second axial limit is decreased by an adjustment mechanism so that the axial distance is less than an axial width of the tread portion.

According to still another aspect of the tire, the hoop structure is constructed of multiple layers allowing shear strain between the multiple layers.

According to yet another aspect of the tire, the hoop structure comprises a first layer of reinforcing cords extending at an angle of between −5° to +5° relative to the circumferential direction of the tire.

According to still another aspect of the tire, the hoop structure comprises a second layer of reinforcing steel cords extending at an angle of between −5° to +5° relative to the circumferential direction of the tire.

According to yet another aspect of the tire, the hoop structure comprises a third layer of elastic construction for absorbing shear strain between the first layer and the second layer.

According to still another aspect of the tire, the third layer consists of a homogenous polymer material.

A structurally supported tire and rim assembly in accordance with the present invention includes a ground contacting annular tread portion, an annular hoop structure for supporting a load on a tire, a means for attachment to a vehicle rim, and a ply structure secured to a first axial limit of the vehicle rim and extending radially outward to adjacent the hoop structure and further extending radially inward from adjacent the hoop structure to a second axial limit of the vehicle rim, the ply structure being secured to both the first axial limit of the vehicle rim and the second axial limit of the vehicle rim, the tread portion being secured proximate the hoop structure.

According to another aspect of the assembly, the ply structure includes a plurality of strips of material extending between the vehicle rim and a position adjacent the hoop structure.

According to still another aspect of the assembly, the ply structure consists of one single strip of material extending repeatedly between the vehicle rim and positions adjacent the hoop structure.

According to yet another aspect of the assembly, the hoop structure defines a shear band having a first layer, a second layer, and a third layer. The first and second layers have reinforcing cords extending at an angle of between −5° to +5° relative to the circumferential direction of the tire.

According to still another aspect of the assembly, the third layer has an elastic construction for absorbing shear strain between the first layer and the second layer.

Another structurally supported tire in accordance with the present invention includes a ground contacting annular tread portion, an annular hoop structure for supporting a load on a tire, a means for attachment to a vehicle rim, a ply structure secured to a first axial limit and extending radially outward to adjacent the hoop structure and further extending radially inward from adjacent the hoop structure to a second axial limit, the ply structure being secured to both the first axial limit and the second axial limit, and an adjustment mechanism for varying an axial distance between the first axial limit and the second axial limit, the tread portion being secured proximate the hoop structure.

According to another aspect of the other tire, the adjustment mechanism includes a threaded bolt and at least two nuts threadedly engaging the threaded bolt.

A method in accordance with the present invention non-pneumatically supports a load. The method includes the steps of: securing a single ply structure to a vehicle rim; clamping the single ply structure to the vehicle rim; extending the single ply structure from the vehicle rim to a radially outer surface of a hoop structure; further extending the single ply structure from the radially outer surface of the hoop structure to the vehicle rim; securing the single ply structure to the vehicle rim; and supporting the load by a compressive hoop strength of the hoop structure and a tensile strength of part of the ply structure.

According to another aspect of the method, a further step includes stretching the ply structure up over the hoop structure.

According to still another aspect of the method, a further step includes decreasing an axial distance between a first part of the vehicle rim and a second part of the vehicle rim such that the axial distance is less than an axial width of the tread portion.

According to yet another aspect of the method, a further step includes attaching the ply structure to a radially outer surface of the hoop structure.

According to still another aspect of the method, a further step includes attaching a tread portion to a radially outer surface of the ply structure.

BRIEF DESCRIPTION OF THE DRAWINGS

The present invention will be better understood through reference to the following description and the appended drawings, in which.

DEFINITIONS

Figure 1:
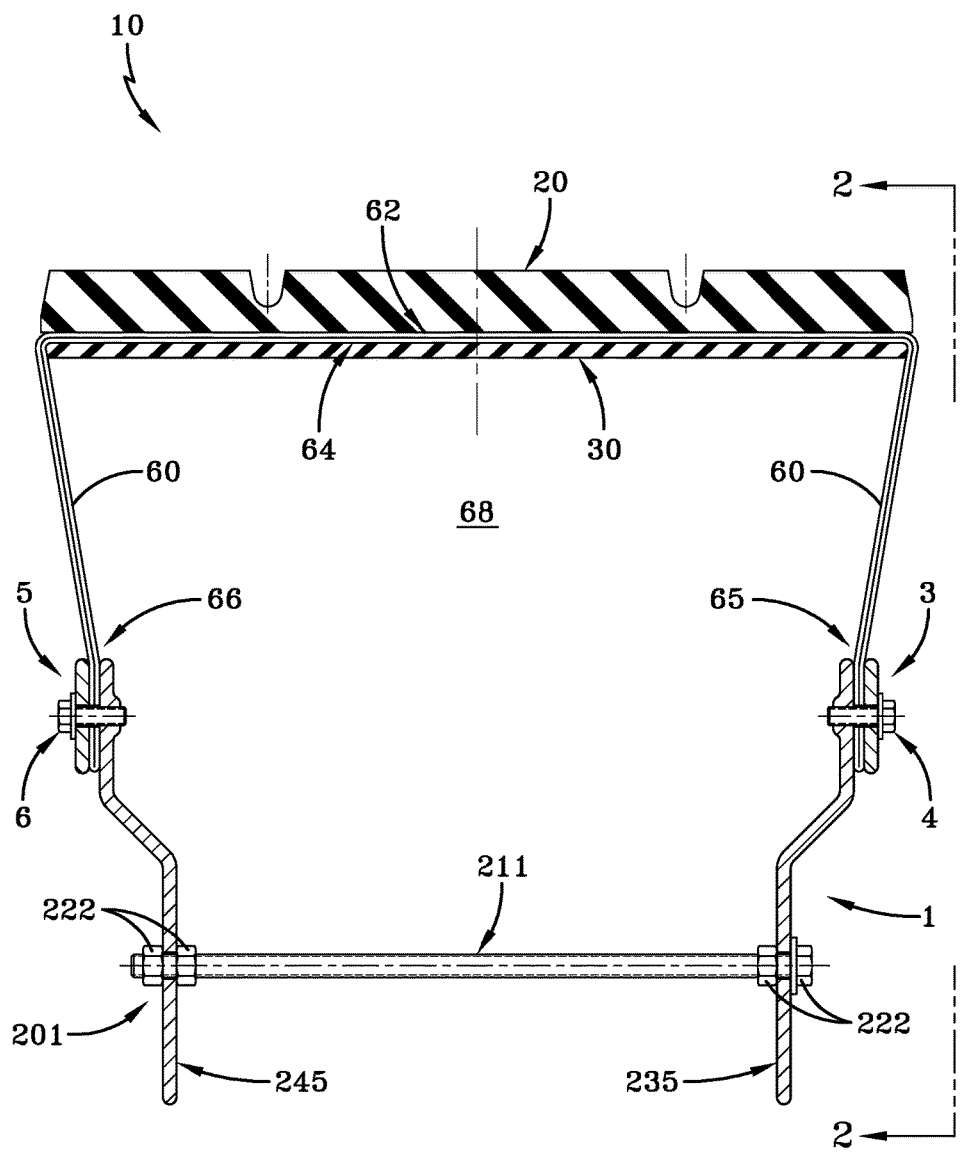
FIG. 1 is a schematic cross section view of a tire/wheel assembly in accordance with the present invention.

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Bending Stiffness" of the shear band EI. The bending stiffness EI may be determined from beam mechanics using a three point bending test. EI may represent a beam resting on two roller supports and subjected to a concentrated load applied in the middle of the beam. The bending stiffness EI may be determined from the following equation: $EI=PL3/48*\Delta X$, where P is the load, L is the beam length, and $\Delta X$ is the deflection.

"Extensional Stiffness" of the shear band EA. The extensional stiffness EA may be is determined by applying a tensile force in the circumferential direction of the shear band and measuring the change in length.

"Hysteresis" means the dynamic loss tangent measured at 10 percent dynamic shear strain and at 25° C.

DETAILED DESCRIPTION OF EXAMPLE OF THE PRESENT INVENTION

Conventional structurally supported tires may support a load without the support of gas inflation pressure. Such a tire may have a ground contacting tread portion, sidewall portions extending radially inward from the tread portion and bead portions at the end of the sidewall portions. The bead portions may anchor the tire to a vehicle wheel. The tread portion, sidewall portions, and bead portions may define a hollow, annular space. Alternately, the bead portion and the tread portion may be connected in the radial direction by a conventional connecting web, which may consist of a number of different geometries. These geometries may include a plurality of radial spokes or a network of polygons, such as hexagons.

One conventional structurally supported tire may have a connecting web or sidewall portion attached thereto. Such a connecting web or sidewall structure does not extend radially beyond a radially inward side of the first membrane. This attachment may be achieved through an adhesive bond. Since the first and second membranes and the intermediate shear layer of this tire together have significant hoop compression stiffness, the interface between the connecting web or sidewall portion and the radially inward side of the first membrane may be will necessarily be exposed to significant shear stresses that tend to degrade or damage the adhesive bond at the interface as the tire is rotated under load (e.g., a large number of load cycles, etc.).

In accordance with the present invention, however, the connecting web or sidewall portion or ply structure may extend radially outward of the hoop structure. Alternatively, the connecting web or sidewall portion or ply structure may extend radially between the first and second membrane, or between the second and third membrane, of the hoop structure. Such a construction may be secured together by a curing step, cohesion, and/or by adhesion. Due to the positioning of the connecting web or sidewall portion or ply structure radially within the hoop structure, the interfaces of the layers may not advantageously eliminate and/or greatly mitigate damaging shear stresses incurred by the conventional tire.

The connecting web or sidewall portion or ply structure may be reinforced by essentially inextensible cords oriented at or near the radial direction. The force/elongation characteristics of the sidewall portions may be such that tensile forces produce minimal elongation of the connecting web or sidewall portion or ply structure, such as an increase of tension in a string may produce minimal elongation of the string. For example, the connecting web or sidewall portion or ply structure may a high stiffness in tension, but very low stiffness in compression.

The connecting web or sidewall portion or ply structure may be essentially inextensible in tension and essentially without resistance to compression and/or buckling. Under this condition, an externally applied load may be supported substantially by vertical tensile forces in the connecting web or sidewall portion or ply structure in the region above the axle without vertical tensile forces in the region below the axle. Vertical stiffness may relate to the ability of the tire to resist vertical deflection when under load. A tire or assembly in accordance with the present invention requires no pneumatic support, and therefore no air pressure maintenance or performance loss due to sudden loss of pressure.

Figure 2:
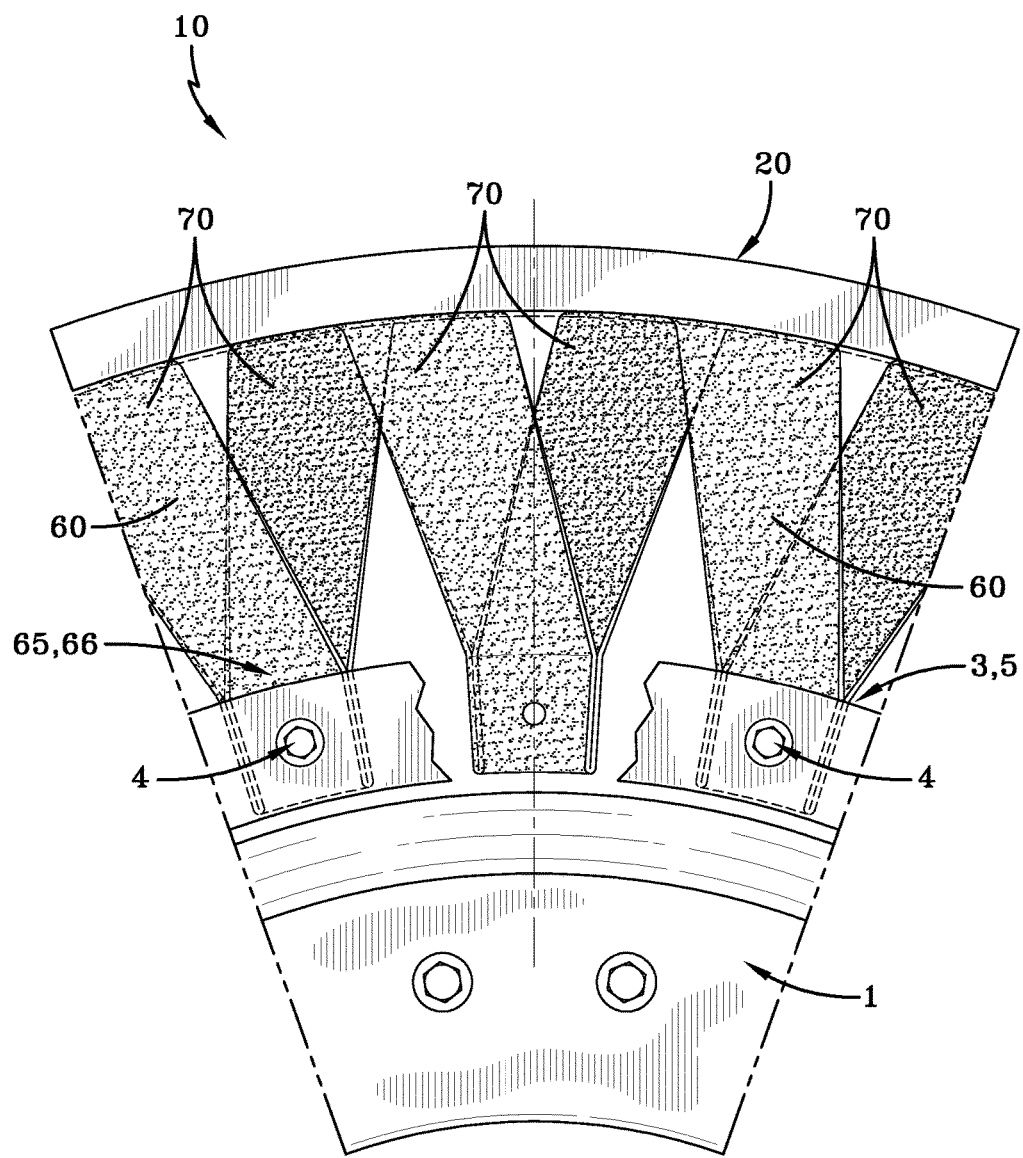
FIG. 2 is a schematic elevation taken along line "2-2" in FIG. 1, with a one layer ply.

As shown in FIGS. 1-2, a structurally supported tire 10 in accordance with the present invention may include a ground contacting annular tread portion 20, a hoop structure 30 for supporting a load on the tire, and a ply structure 60 secured to a first axial limit of an outer radius of a rim 1 and extending radially outward and between the hoop structure and the tread portion and further extending radially inward from between the hoop structure and tread portion to a second axial limit of the outer radius of the rim. The tread portion 20 may be secured to a radially outer surface 62 of the ply structure 60. The hoop structure 30 may be secured to a radially inner surface 64 of the ply structure 60. The attachment of the ply structure 60 to the rim 1 may be accomplished in a number of ways. For example, the vehicle rim 1 may have a first clamp 3 and a second clamp 5. The first clamp 3 may squeeze and secure a first part 65 of the ply structure 60. The second clamp 5 may squeeze and a second part 66 of the ply structure 60.

Alternatively, the first clamp 3 may squeeze and secure both the first part 65 of the ply structure 60 and a first ring (not shown) thus eliminating the necessity for a first ring to be inextensible (e.g., like conventional bead structures). The second clamp 5 may squeeze and secure both the second part 66 of the ply structure 60 and a second ring (not shown) thus eliminating the necessity for the second ring to be inextensible (e.g., like conventional bead structures). If used, the non-load bearing first and second rings may therefore be an inexpensive material, such as a very inexpensive polymer O-ring. Further, adhesives and mechanical fasteners 4, 6 (e.g., bolts, etc.) may also be used to squeeze/secure and/or supplement the attachment to the first and second parts 65, 66 of the ply structure.

As shown in FIG. 2, the ply structure 60 may be defined by strips 70 of material extending from the first clamp 3 radially outward and around the hoop structure 30 and to the second clamp 5. As described below, the strips 70 may be a layered and reinforced ply material capable of bearing a large tensile load and very little compressive load.

Figure 3:
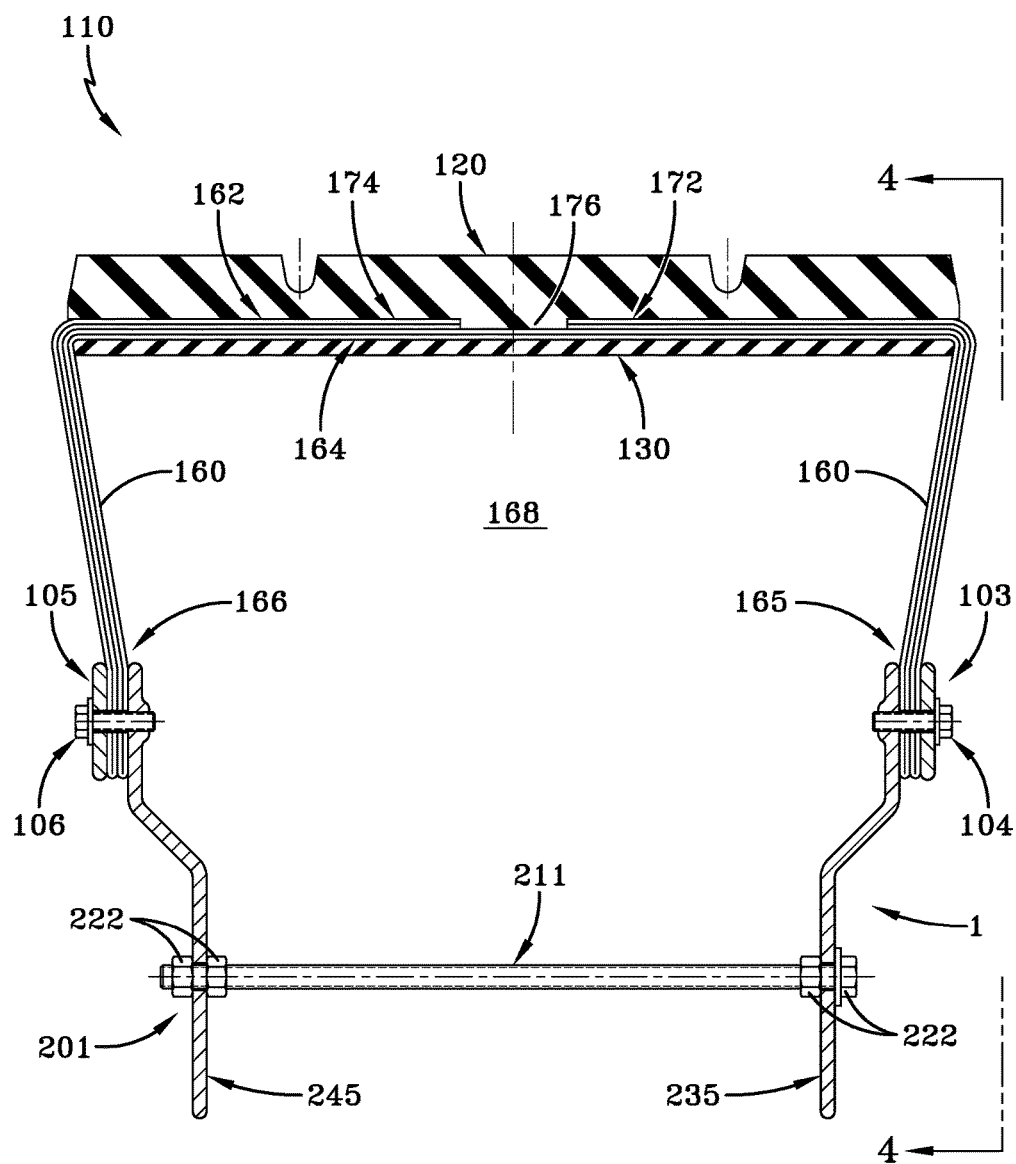
FIG. 3 is a schematic cross section view of another tire/wheel assembly in accordance with the present invention.
Figure 4:
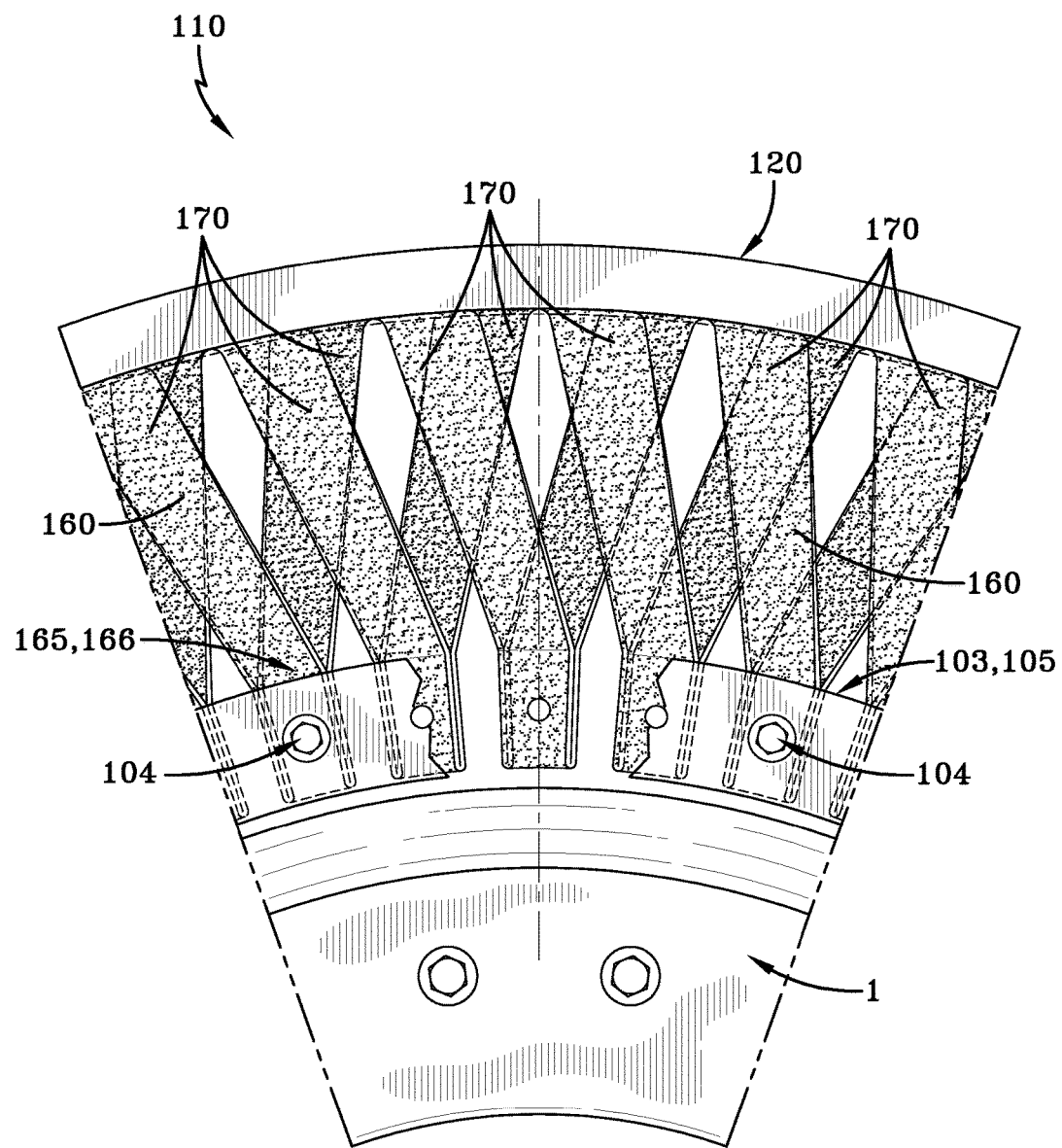
FIG. 4 is a schematic elevation taken along line "2-2" in FIG. 3, with a two layer ply.

As shown in FIGS. 3-4, another structurally supported tire 110 in accordance with the present invention may include a ground contacting annular tread portion 120, a hoop structure 130 for supporting a load on the tire, and a ply structure 160 secured to one axial limit of an outer radius of the rim 1 and extending radially outward and between the hoop structure and the tread portion and further extending radially inward from between the hoop structure and tread portion to a second axial limit of an outer radius of the rim. The tread portion 120 may be secured to a radially outer surface 162 of the ply structure 160. The hoop structure 130 may be secured to a radially inner surface 164 of the ply structure 160. The attachment of the ply structure 160 to the rim 1 may be accomplished in a number of ways. For example, the vehicle rim 1 may have a first clamp 103 and a second clamp 105. The first clamp 103 may squeeze and secure a first part 165 of the ply structure 160. The second clamp 105 may squeeze and a second part 166 of the ply structure 160.

Alternatively, the first clamp 103 may squeeze and secure both the first part 165 of the ply structure 160 and a first ring (not shown) thus eliminating the necessity for a first ring to be inextensible (e.g., like conventional bead structures). The second clamp 105 may squeeze and secure both the second part 166 of the ply structure 160 and a second ring (not shown) thus eliminating the necessity for the second ring to be inextensible (e.g., like conventional bead structures). If used, the first and second rings may therefore be an inexpensive material, such as a very inexpensive polymer O-ring. Further, adhesives and mechanical fasteners 104, 106 (e.g., bolts, etc.) may also be used to squeeze/secure and/or supplement the attachment to the first and second parts 165, 166 of the ply structure 160.

As shown in FIG. 4, the ply structure 160 may be defined by strips 170 of material. One example strip 170 may extend from a first end 172 of the strip 170 to the first clamp 103. The example strip 170 may then be folded back over itself and extended radially outward and around the hoop structure 130 and to the second clamp 105. The example strip 170 may then be folded back over itself and extended radially outward beyond the hoop structure 130 and to a second end 174 of the example strip 170. As shown in FIG. 3, a gap 176 may be defined by the ends 172, 174 of the strip 170. Alternatively, the ply structure 160 may be constructed of one single strip 170 of ply material leaving only a single gap 176 between the ends 172, 174 for the entire ply structure 160. As described below, the strips 70 may be a layered and reinforced ply material capable of bearing a large tensile load and very little compressive load.

As described above, the tire 10 or 110 may include the hoop structure, or shear band 30 or 130 and the ply structure 60 or 160. The ply structure 60 or 160 may be built at a conventional bead diameter and then stretched up over the shear band 30 or 130. The path of the ply structure 60 or 160 may extend radially inward from the radially outermost portion of the shear band 30 or 130. This may allow reinforcing the ply cords to provide lateral strength to the shear band 30 or 130 while also filling part of any gap between the radially outer portion of the ply structure 60 or 160 and a radially inner portion of the shear band. An angle θ may be varied to adjust tension in the ply structure 60 or 160 and also increase and/or tune lateral stiffness of the tire 10 or 110 overall. The angle θ may also be zero degrees or even negative if desired (not shown). Thus, the angle θ provides an important tuning parameter lacking in any conventional structurally supported, non-pneumatic, or pneumatic tires.

A method in accordance with the present invention may non-pneumatically support a load. The method may include the steps of: securing a single ply structure 60, 160 to a vehicle rim 1; clamping the single ply structure to the vehicle rim; extending the single ply structure 60, 160 a radially outer surface 62, 162 of a hoop structure 30, 130; further extending the single ply structure 60, 160 from the radially outer surface 62, 162 of the hoop structure 30, 130 to the vehicle rim 1; securing the single ply structure 60, 160 the vehicle rim 1; and supporting a load by a compressive hoop strength of the hoop structure 30, 130 and a tensile strength of part of the ply structure 60, 160.

The reinforced annular band or hoop structure 30, 130 may be disposed radially inward of the tread portion 20, 120. The annular band 30, 130 may comprise an elastomeric shear layer, a first membrane having reinforced layers adhered to the radially innermost extent of the elastomeric shear layer, and a second membrane having reinforced layers adhered to the radially outermost extent of the elastomeric shear layer. The tread portion 20, 120 may have no grooves or may have a plurality of longitudinally oriented tread grooves forming essentially longitudinal tread ribs therebetween. Ribs may be further divided transversely or longitudinally to form a tread pattern adapted to the usage requirements of the particular vehicle application. Tread grooves may have any depth consistent with the intended use of the tire.

The second membrane may be offset radially inward from the bottom of the tread groove a sufficient distance to protect the structure of the second membrane from cuts and small penetrations of the tread portion 20, 120. The offset distance may be increased or decreased depending on the intended use of the tire 10, 110. For example, a heavy truck tire may use an offset distance of about 5 mm to 7 mm.

Each of the layers of the first and second membranes may comprise essentially inextensible reinforcing cords embedded in an elastomeric coating. For a tire constructed of elastomeric materials, membranes may be adhered to the shear layer by the vulcanization of the elastomeric materials. The membranes may be adhered to the shear layer by any other suitable method of chemical or adhesive bonding or mechanical fixation.

The reinforcing cords of the first and second membranes may be suitable tire belt reinforcements, such as monofilaments or cords of steel, aramid, and/or other high modulus textiles. For example, the reinforcing cords may be steel cords of four wires of 0.28 mm diameter (4×0.28). Although the reinforcing cords may vary for each of the membranes, any suitable material may be employed for the membranes which meets the requirements for the tensile stiffness, bending stiffness, and compressive buckling resistance required by the annular band. Further, the membrane structures may be a homogeneous material, a fiber reinforced matrix, or a layer having discrete reinforcing elements (e.g., short fibers, nanotubes, etc.).

In the first membrane, the layers may have essentially parallel cords oriented at an angle relative to the tire equatorial plane and the cords of the respective adjacent layers may have an opposite orientation. That is, an angle $+\alpha$ in one layer and an angle $-\alpha$ in another adjacent layer. Similarly, for the second membrane, the layers may have essentially parallel cords oriented at angles $+\beta$ and $-\beta$, respectively, to the equatorial plane. Angles $\alpha$ and $\beta$ may be in the range of about $-5°$ to about $+5°$. Alternatively, the cords of adjacent layers in a membrane may not be oriented at equal and opposite angles. For example, it may be desirable for the cords of adjacent layers to be asymmetric relative to the tire equatorial plane. The cords of each of the layers may be embedded in an elastomeric coating layer having a shear modulus of about 20 MPa. The shear modulus of the coating layers may be greater than the shear modulus of the shear layer so that the deformation of the annular band is primarily by shear deformation within shear layer.

As the vertical deflection of the tire increases, the contact length, or footprint, may increase such that the compressive stress in the second membrane exceeds its critical buckling stress and a longitudinal buckling of the second membrane may occur. This buckling phenomenon may cause a longitudinally extending section of the footprint region to have reduced contact pressure. A more uniform ground contact pressure throughout the length of the footprint may be obtained when buckling of the membrane is mitigated and/or avoided.

The hoop structure 30, 130 may be similar to the annular band described above, an annular, a homogenous hoop of metal, polymer, rubber, reinforced rubber, or fabric, and/or a multiple layer structure of alternating steel cord plies and filament plies and rubber shear layers as long as the hoop structure can support the appropriate load by its compressive hoop strength. Once the tire 10, 110 is fully constructed, the hoop structure 30, 130 may be secured to the radially inner surface 64, 164 of the ply structure 60, 160 by the overall structure of the tire (e.g., friction, mechanical constraint, etc.) or by an adhesive. This is a departure from conventional pneumatic and non-pneumatic tires, where a hoop structure is exclusively connected to the radially outer surface of the connecting structure, be it plies, a combination of pressurized air and plies, spokes, or other web geometries. A tire 10, 110 in accordance with the present invention may result in the interface between the hoop structure 30, 130 and the ply structure 60, 160 being in compression 180 degrees from the footprint (e.g., top of the tire), where the tensile ply loads are the highest.

The material of the shear band 30, 130 may have a shear modulus in the range of 15 MPa to 80 MPa, or 40 MPa to 60 MPa. The shear modulus is defined using a pure shear deformation test, recording the stress and strain, and determining the slope of the resulting stress-strain curve. It may be desirable to maximize EI and minimize GA. An acceptable ratio of GA/EI for a conventional tire may be between 0.01 and 20.0. However, acceptable ratios of GA/EI for a shear band 30, 130 in accordance with the present invention may be 0.02 to 100.0, or between 21.0 and 100.0, or between 1.0 and 50.0.

The tread portion 20, 120 may be secured to the radially outer surface 62, 162 of the ply structure 60 by an adhesive. The hoop structure 30, 130 may have a concave, or toroidal, shape producing a curved tread portion 20, 120 as is desirable. The hoop structure 30, 130 and ply structure 60, 160 may thereby define a cavity 68, 168 that may or may not be open to the atmosphere and/or unpressurized. When the tread portion 20, 120 has been suitably worn down from use, the entire vehicle rim/tire assembly 1, 10, 110 may remain assembled while the remains of the tread portion are ground down and replaced by a new tread portion, similar to a conventional retreading process.

As described above, the vehicle rim 1, may have the ability to adjust the axial distance between the clamps 3, 5, 103, 105. Such adjustment may vary the tension and angle of the ply structure 60, 160 between the clamps 3, 5, 103, 105 and the hoop structure 30, 130 thereby altering footprint characteristics of the tire 10, 110 during rotation under load.

As shown in FIGS. 1 & 3, the adjustment mechanism 201 for the axial distance between the clamps 3, 5, 103, 105 may include a threaded bolt 211 and four nuts 222 for varying the axial length between two parts 235, 245 each associated with one of the parts 65, 66 or 165, 166 of the ply structure 30, 130. The two parts 235, 245 may or may not be part of the vehicle rim 1.

Further, suitable alternate adjustment mechanisms may also be used. Another adjustment mechanism for the axial distance between the clamps 3, 5, 103, 105 may include replacing the threaded bolt 211 with a piston/cylinder assembly operatively connected to the rotational axis of the tire 10, 110. The piston/cylinder assembly may have a length greater than any desired axial distance between the clamps 3, 5, 103, 105. The ends of the piston/cylinder assembly may each threadedly engage rings for controlling the axial distance between the clamps 3, 5, 103, 105.

Alternatively, one end of a piston/cylinder assembly may be rotationally attached (e.g., welded, adhesive, bolted, etc.) to the vehicle rim 1 near one of the clamps 3, 5, 103, 105 with the other end attached to the vehicle frame. Thus, with the opposite clamp 3, 5, 103, 105 axially fixed, the axial distance may be adjusted by engagement of the piston/cylinder assembly.

Applicants understand that many other variations are apparent to one of ordinary skill in the art from a reading of the above specification. These variations and other variations are within the spirit and scope of the present invention as defined by the following appended claims.

What is claimed:

1. A structurally supported tire comprising
a ground contacting annular tread portion;
an annular hoop structure for supporting a load on the tire;
a clamp for attachment to a vehicle rim; and
a ply structure secured to a first axial limit and extending radially outward and between the hoop structure and the tread portion and further extending radially inward from between the hoop structure and tread portion to a second axial limit, the ply structure being secured to both the first axial limit and the second axial limit, the tread portion being secured to a radially outer surface of the ply structure, the hoop structure being secured to a radially inner surface of the ply structure, the ply structure consisting of one single strip of material extending repeatedly between the vehicle rim and adjacent the hoop structure.

2. The structurally supported tire as set forth in claim 1 wherein inner radii of the ply structure are attached to the vehicle rim through two mechanical clamps each capturing a part of the ply structure.

3. The structurally supported tire as set forth in claim 1 wherein inner radii of the ply structure are attached to the vehicle rim through mechanical clamps and a clamping force is strengthened by adding rings around which the ply structure is folded.

4. The structurally supported tire as set forth in claim 1 wherein an axial distance between the first axial limit and the second axial limit is decreased by an adjustment mechanism so that the axial distance is less than an axial width of the tread portion.

5. The structurally supported tire as set forth in claim 1 wherein the hoop structure is constructed of multiple layers allowing shear strain between the multiple layers.

6. The structurally supported tire as set forth in claim 1 wherein the hoop structure comprises a first layer of reinforcing cords extending at an angle of between −5° to +5° relative to the circumferential direction of the tire.

7. The structurally supported tire as set forth in claim 1 wherein the hoop structure comprises a second layer of reinforcing steel cords extending at an angle of between −5° to +5° relative to the circumferential direction of the tire.

8. The structurally supported tire as set forth in claim 7 wherein the hoop structure comprises a third layer of elastic construction for absorbing shear strain between the first layer and the second layer.

9. The structurally supported tire as set forth in claim 8 wherein the third layer consists of a homogenous polymer material.

10. A structurally supported tire and rim assembly comprising
a ground contacting annular tread portion;
an annular hoop structure for supporting a load on a tire;
a clamp for attachment to a vehicle rim; and
a ply structure secured to a first axial limit of the vehicle rim and extending radially outward to adjacent the hoop structure and further extending radially inward from adjacent the hoop structure to a second axial limit of the vehicle rim, the ply structure being secured to both the first axial limit of the vehicle rim and the second axial limit of the vehicle rim, the tread portion being secured proximate the hoop structure, the ply structure consisting of one single strip of material extending repeatedly between the vehicle rim and adjacent the hoop structure,
the hoop structure defining a shear band comprising a first layer, a second layer, and a third layer, the first and second layers comprising reinforcing cords extending at an angle of between −5° to +5° relative to the circumferential direction of the tire, the third layer having an elastic construction for absorbing shear strain between the first layer and the second layer.

11. A structurally supported tire comprising
a ground contacting annular tread portion;
an annular hoop structure for supporting a load on a tire;
a clamp for attachment to a vehicle rim;
a ply structure secured to a first axial limit and extending radially outward to adjacent the hoop structure and further extending radially inward from adjacent the hoop structure to a second axial limit, the ply structure being secured to both the first axial limit and the second axial limit, the ply structure consisting of one single strip of material extending repeatedly between the vehicle rim and adjacent the hoop structure; and
an adjustment mechanism for varying an axial distance between the first axial limit and the second axial limit, the tread portion being secured proximate the hoop structure, the adjustment mechanism includes a threaded bolt and at least two nuts threadedly engaging the threaded bolt.

* * * * *